Aug. 28, 1956  L. A. EDERER  2,760,402
SLIP STITCH DEVICE
Filed Nov. 26, 1952  7 Sheets-Sheet 1

Inventor
Lothar A. Ederer
by Parker & Carter
Attorneys

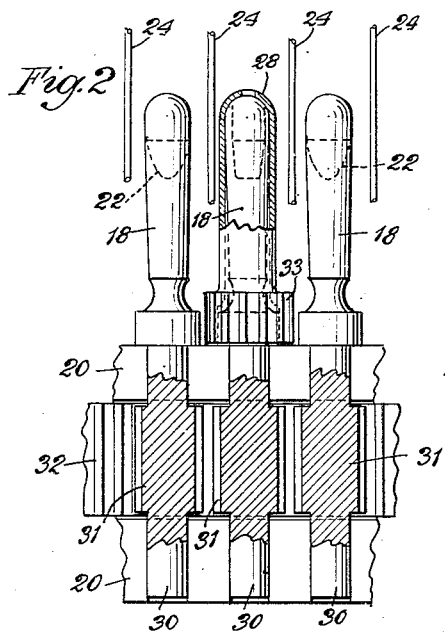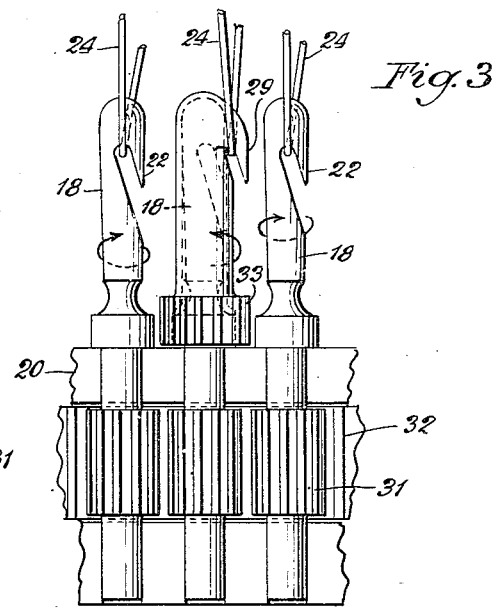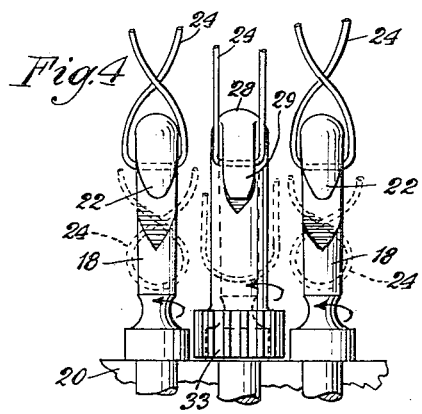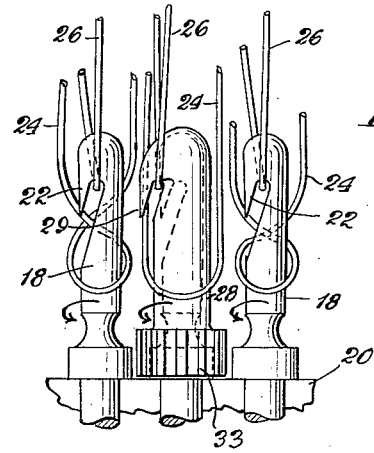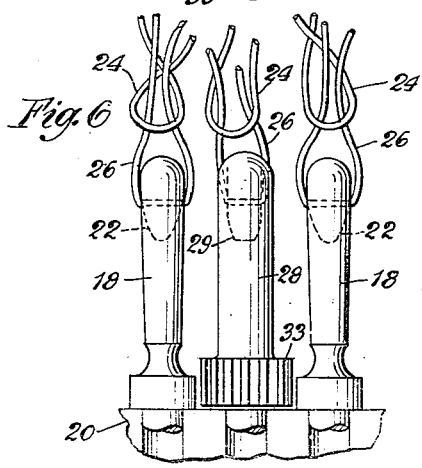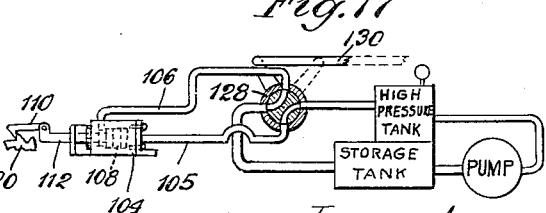

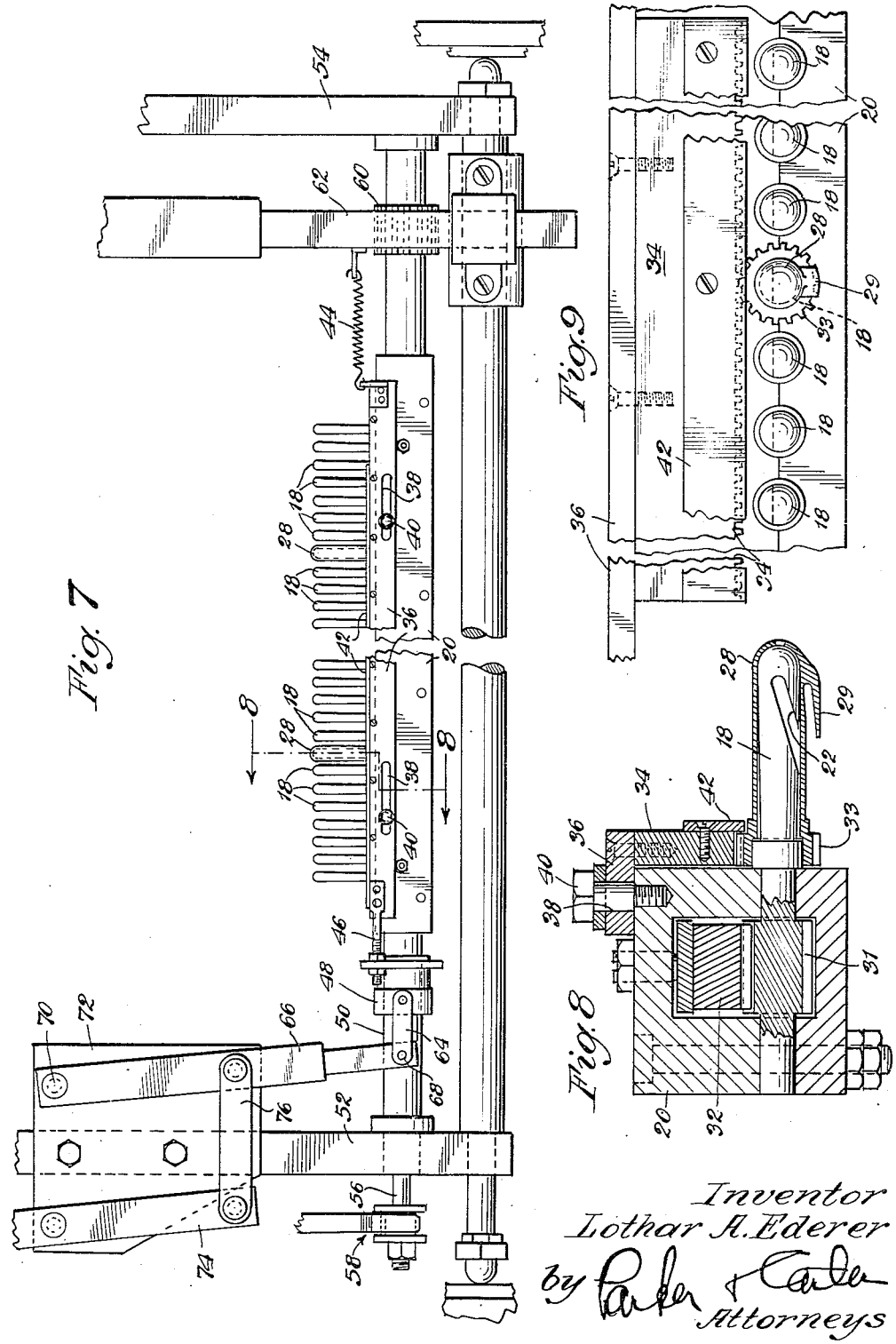

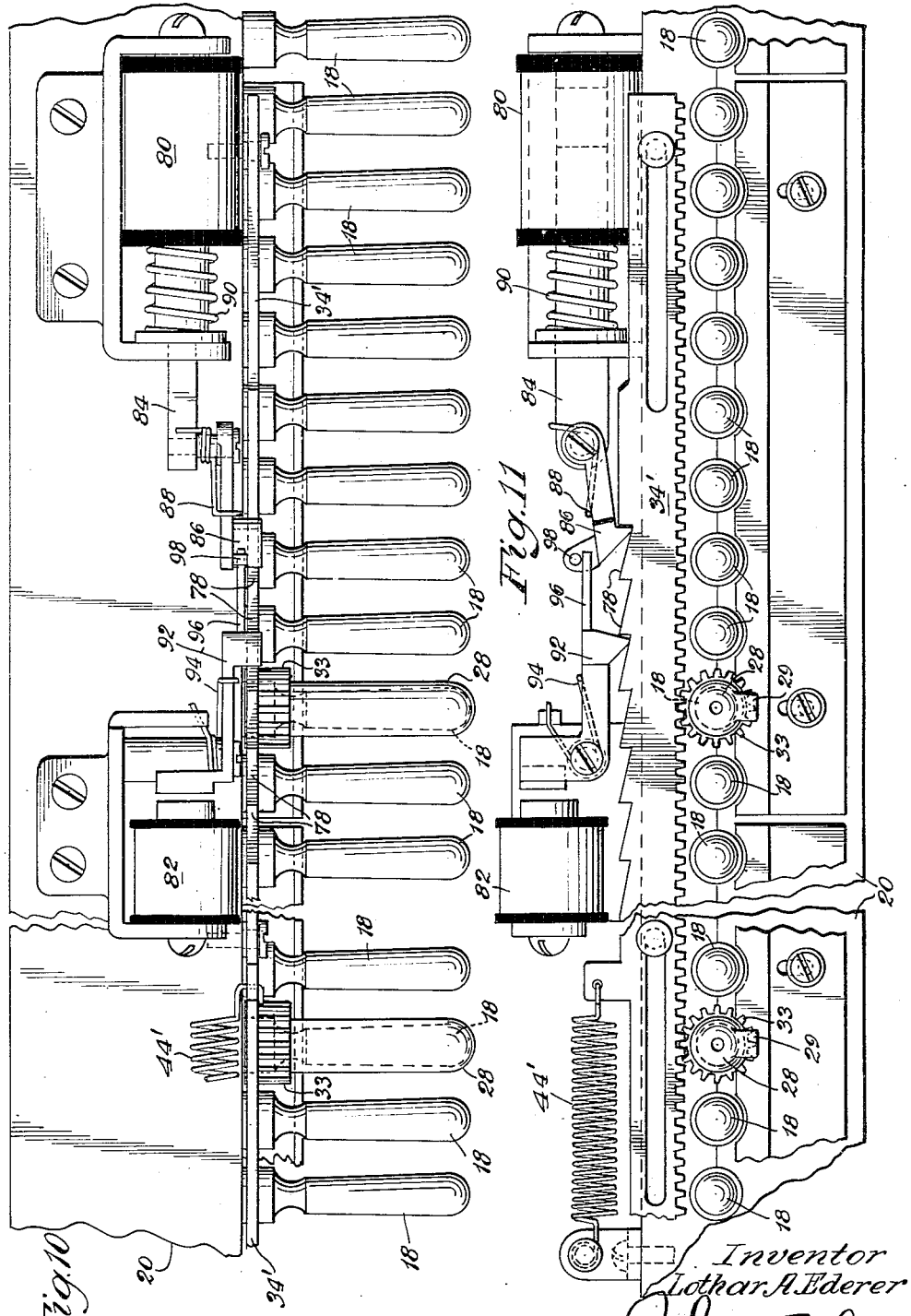

Aug. 28, 1956 L. A. EDERER 2,760,402
SLIP STITCH DEVICE
Filed Nov. 26, 1952 7 Sheets-Sheet 5

Inventor
Lothar A. Ederer
by Parker & Carter
Attorneys

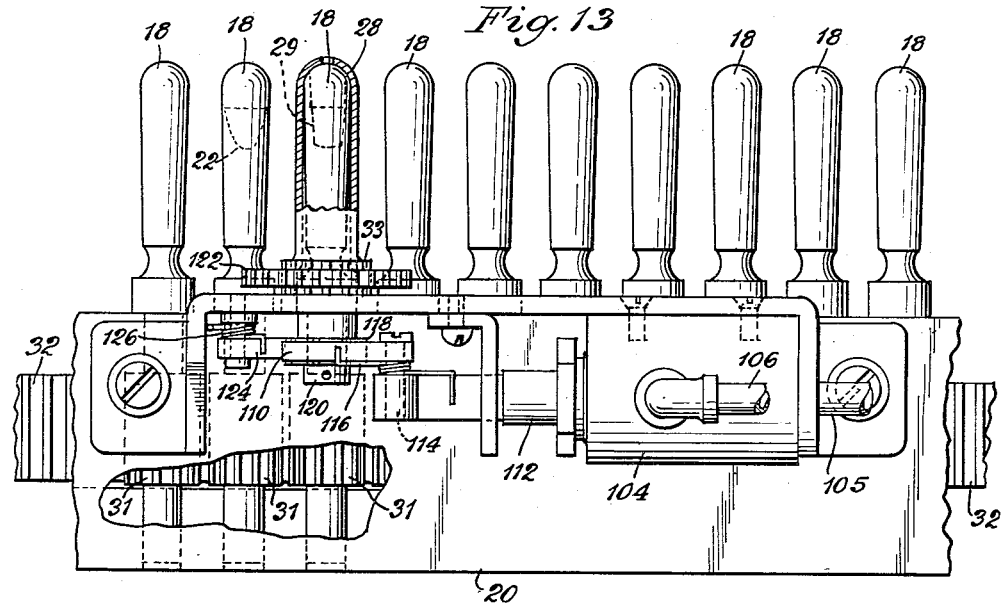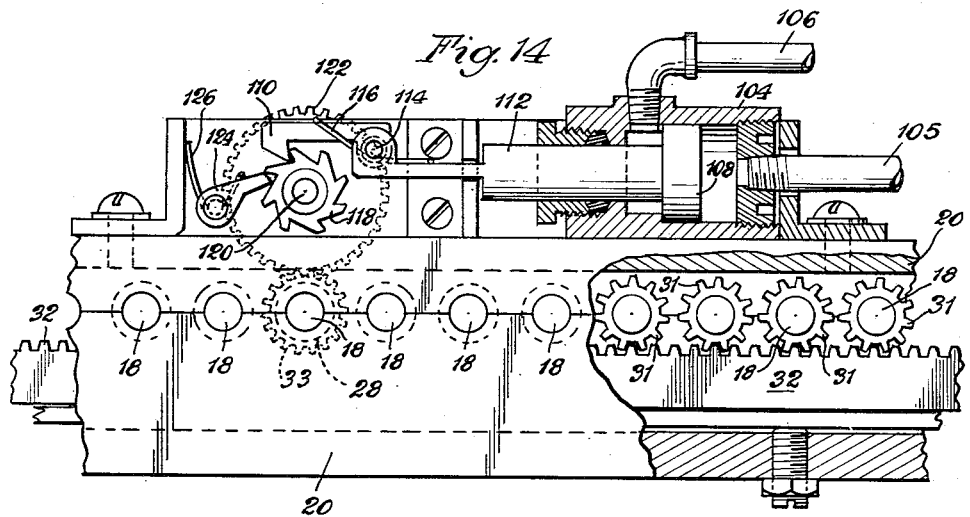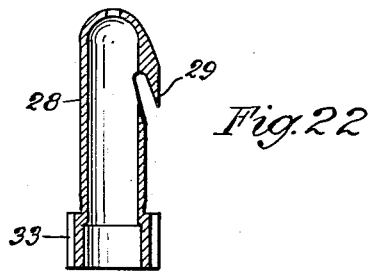

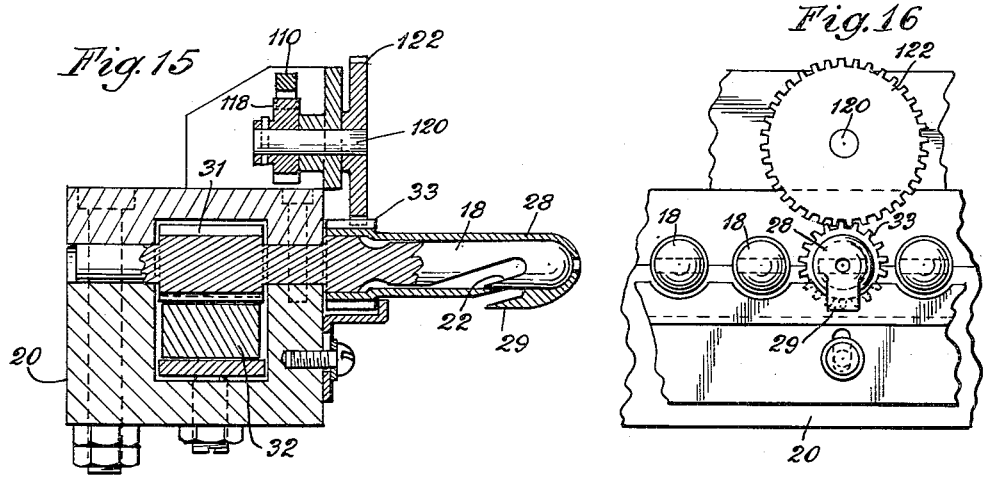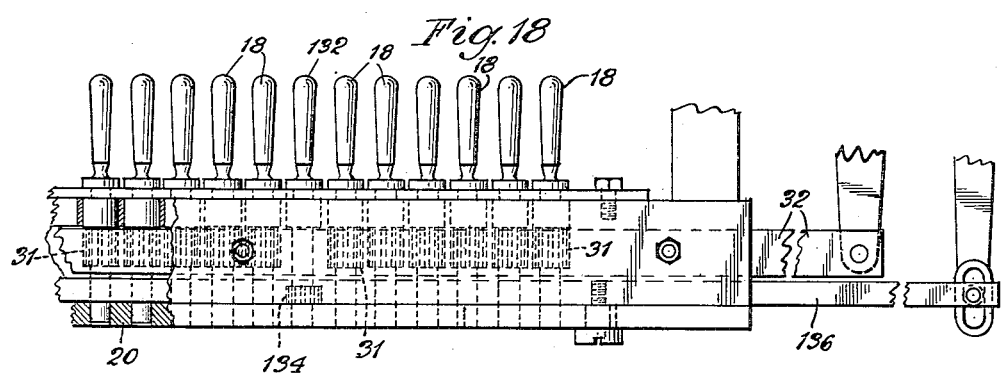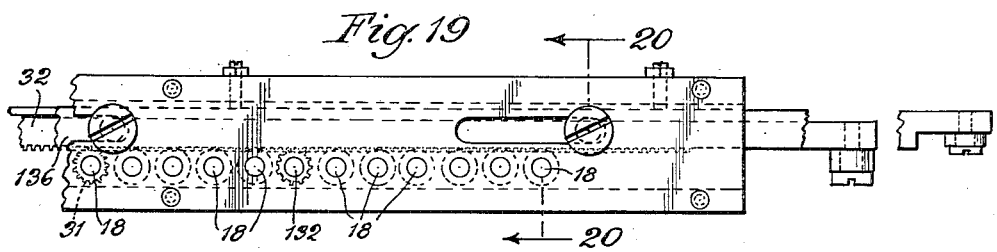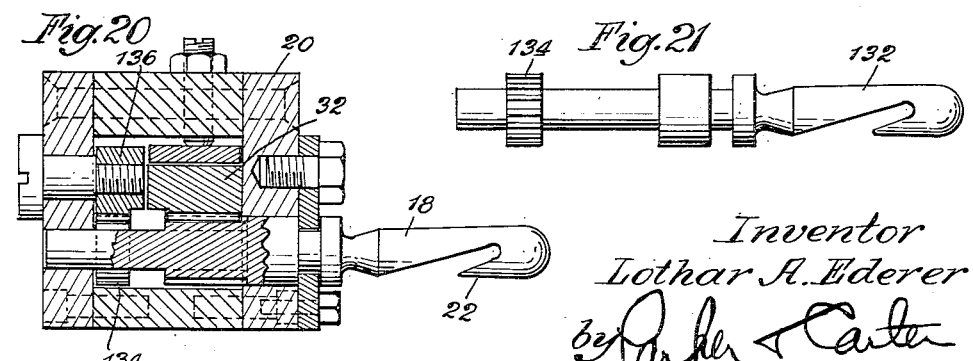

2,760,402
SLIP STITCH DEVICE

Lothar A. Ederer, Chicago, Ill., assignor, by mesne assignments, to The Linen Thread Co., Inc., New York, N. Y., a corporation of Delaware Application November 26, 1952, Serial No. 322,702

11 Claims. (Cl. 87—53)

My invention resides in the field of machines for making nets and is an improvement on prior machines which twist and knot thread or twine into a predetermined pattern so as to produce a symmetric net.

At times in the fishing industry it is found desirable to have extremely wide nets, these nets being far wider than produced by the presently existing machines in that the carriages and rolls of these machines are smaller in width than the nets desired. Consequently, it has been necessary to take several of the widths produced by a conventional machine and splice the edges together to obtain the requisite width desired by the industry. The strands along the edges of a width of net produced by a conventional machine do not have sufficient slack to allow for the splicing. This has posed a serious problem because the net along the splice is tight and the strain placed thereon by a large catch will result in a failure or rupture.

One solution to this problem has been accomplished by cutting symmetrically through a net from one strand to another along one thread from one knot to another until a new set of strands are exposed adjacent to the edge, or a new edge is formed, these strands having sufficient slack for proper splicing. This method requires that the operator laboriously cut from one knot to the other until an entire edge has been exposed or removed.

Therefore, a primary object of my invention is a new and improved netting mechanism whereby a slip thread or slip mesh may be interposed in a net during its manufacture at any selected point so that this thread need only be cut at one point and unraveled to expose strands on the outer edges of the net which have sufficient slack for proper splicing. Each of these strands will have a pre-formed loop which is very advantageous in splicing one section or width of net to another.

Another object of my invention is a device in a netting machine for causing one selected strand of thread out of a plurality of strands to loop through instead of knotting with its adjacent strands of thread.

Another object of my invention is a cam controlled device operated in timed relationship with the netting machine for controlling the movements of the selected strand that is to loop through instead of knotting with its adjacent strands of thread.

Another object of my invention is a hydraulically controlled device operated in timed relationship with the netting machine for controlling the movements of the selected strand.

Another object of my invention is an electrically controlled device operated in timed relationship with the netting machine for controlling the movements of the selected strand.

Another object of my invention is a method of making a slip mesh net.

Another object of my invention is a new and improved slip thread or slip mesh net.

Other objects will appear from time to time in the ensuing specifications and drawings in which:

Figure 2 is a detail view of a soldier bar mechanism showing three soldier pins with hooks on the ends, each of which grasps the threads to form the net and tie the knots;

Figure 3 is the same as Figure 2 and illustrates the same three soldier pins in a different position in the process of net making;

Figure 4 is a third position of the same three pins;

Figure 5 is a fourth position of the same three pins, with a second thread for each pin being brought into the knotting process;

Figure 6 shows a fifth position of the pins as the knot is being formed;

Figure 7 is a plan view of a conventional soldier bar mechanism with two sleeves placed over a nonadjacent pair of soldier pins;

Figure 8 is a sectional view taken along line 8—8 of Figure 7;

Figure 9 is a side view of the soldier bar shown in Figure 8;

Figure 10 is a plan view of a soldier bar with a solenoid or electrically actuated mechanism for controlling the movement of the soldier bar sleeve;

Figure 11 is a side view of the solenoid controlled mechanism in Figure 10;

Figure 13 is a plan view of the mechanism showing another form of mechanism for actuating the soldier bar sleeve;

Figure 14 is a side view of the mechanism shown in Figure 13;

Figure 15 is a sectional view of the mechanism shown in Figures 13 and 14;

Figure 16 is a detail of the actuating mechanism shown in Figure 15;

Figure 17 is a schematic view of a hydraulic mechanism for controlling the soldier bar and sleeve in this modification;

Figure 18 is a modified form of the mechanism for actuating the soldier pins so as to eliminate the soldier bar sleeve;

Figure 19 is a side view of the mechanism shown in Figure 18;

Figure 20 is a sectional view taken along line 20—20 of Figure 19;

Figure 21 is a detail view of a modified form of soldier pin;

Figure 22 is a detail view of an individual soldier bar sleeve; and

Figure 1:
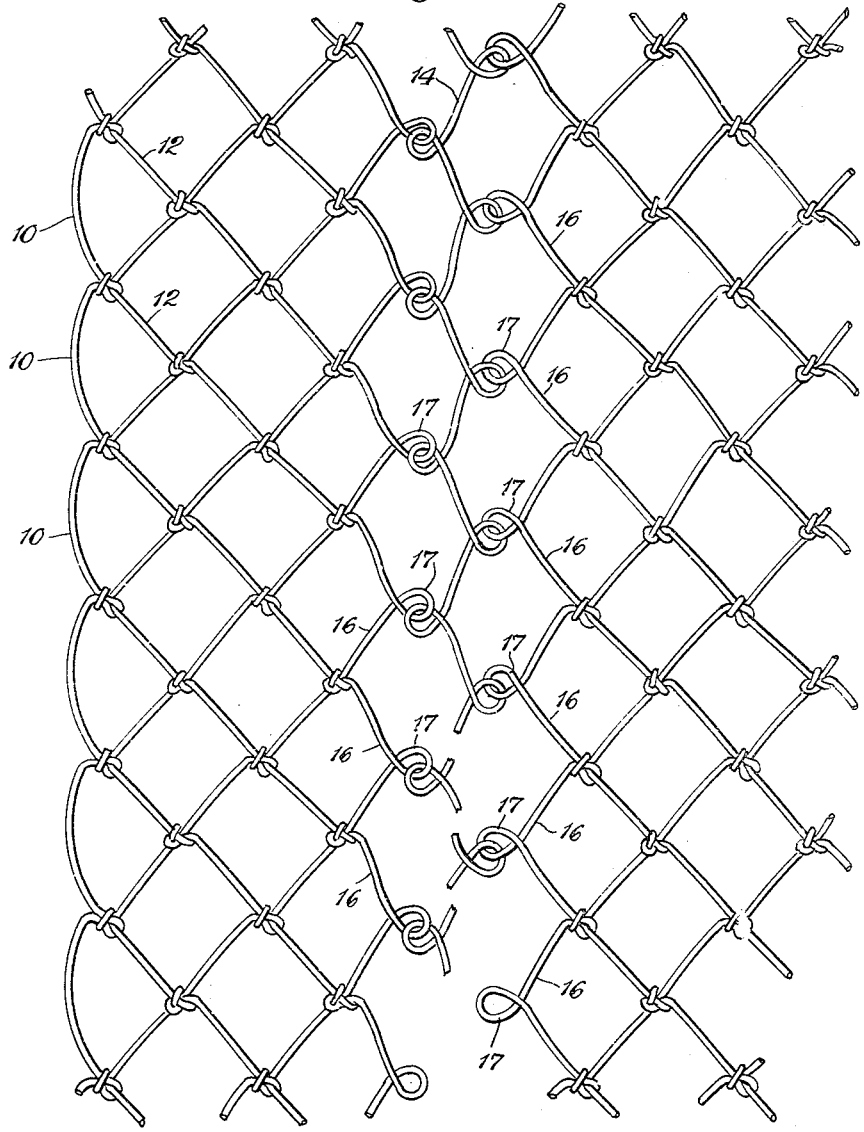
Figure 1 is a view of a section of net showing a slip thread interposed in a conventional net section, the net to the left and right of the slip thread being formed as a series of equally spaced knots.

In Figure 1 a conventional net has been formed by the knotting or weaving of a plurality of threads or strands into a composite net which is formed of a plurality of sequentially and equally spaced knots. The strands interconnecting each of the knots are formed on a diagonal except at the outer edge of a section or width wherein the strand will run from one knot to another in a vertical direction such as at 10. In splicing one section of net to another, it will be necessary to extend an outside strand, such as 10, to a sufficient length of net for proper splicing so that the outside strand 10 must at least equal two of the normal diagonal strands as at 12. To avoid the difficulty of extending this outside strand 10, as it is obviously shorter than the combination of two inside normal strands 12, I have provided a mechanism that will interpose a slip thread at 14 which is only looped through and not knotted to the strands adjacent it. Thus the operator needs only to cut the slip strand or thread 14 at any point and unravel or pull the slipped thread out, thus exposing a plurality of outside strands 16 which are of sufficient length for proper splicing and each of which will have a preformed loop as at 17.

In Figures 2, 3, 4, 5, and 6 a portion of a conventional soldier bar is shown which carries a plurality of soldier pins of which I have illustrated three. These pins are mounted in the soldier bar and extend outwardly therefrom, each pin having a hook or groove formed in its outer end, this groove being used to grasp one or more threads to form the same into a knot. The soldier bar is mounted for movement back and forth from the machine working station as well as for movement from side to side; however, as that mechanism does not form any part of the present invention, it has not been shown nor will it be described. Each of the soldier pins 18 is rotatably mounted in the soldier bar 20, and is provided at its extreme end with a hook portion 22. Figures 2, 3, 4, 5, and 6 represent various positions of the soldier pins during the knot forming operation. In Figure 2, the pins are positioned with their hook ends faced away from the observer, and they are actuated by appropriate mechanism (not shown) during the movement of the soldier bar 20 so that each pin grasps a depending thread 24. From the position in Figure 3, after each pin has grasped its thread, the pins all turn counterclockwise (as viewed from above) three-quarters of a turn to the position shown in Figure 4, thus forming a loop in the threads 24 after the pins have grasped the threads, such as shown in Figure 3. The soldier bar then moves the pins through the loops as shown in Figure 4 until the loop in each thread 24 encircles the shank of each pin as shown in dotted lines in Figure 4. Then, due to the movement of the soldier bar 20, each of the pins again grasps a second thread 26, as shown in Figure 5, and draws the same downwardly through the loop formed in the initial thread 24. In Figure 6, the outside pins have drawn the second thread down through the loop formed in the initial thread 24; however, the initial or middle soldier pin is covered by a removable sleeve 28 having a hook portion 29 which is actuated separately and independently from the other soldier pins. As shown in Figures 2 and 3, each of the soldier pins has an extended shank 30 upon which is formed a gear 31. All of the gears on the respective soldier pins are engaged by a rack 32 which is shifted in timed relationship with the operation of the machine, thus causing uniform movement in all the soldier pins 18. However, the sleeve 28 is only loosely placed over the middle pin, as shown in these figures, and it will freely rotate with respect to the soldier pin over which it is mounted; therefore, it does not move as the other pins move, but derives its movement through a separate rack which engages a gear 33 on the lower edge of the sleeve. The rack for the sleeve 28, to be shown and described subsequently, is actuated independently from the main rack 32. Consequently the movements of the sleeve are independently controlled and are such that no loop is formed in its initial thread 24. In the movements of the soldier bar and the pins, as shown in these figures, the sleeve grasps an initial thread in the same manner as the other soldier pins and turns one quarter of a turn clockwise, as viewed from above, to the position shown in Figure 3. As the soldier pins all rotate three-quarters of a turn counter-clockwise, as viewed from above, to the position shown in Figure 4 wherein they form a loop in the initial thread 24, the sleeve only rotates a quarter of a turn clockwise, as viewed from above, to the position shown in Figure 4, and it should be noted that its thread 24 does not have a loop formed therein as do the two adjacent threads. Due to the movement of the soldier bar each of the pins is forced through its loop in the initial thread 24, but the sleeve has no loop through which to pass; therefore, the sleeve only loosely passes through an unlooped portion of the initial thread 24 and grasps a second thread 26 as do the adjacent soldier pins. Then, in moving from the position as shown in Figure 5 to the position shown in Figure 6 wherein the second thread 26 is pulled through the loops formed in the initial thread 24, the sleeve 28 again turns one quarter of a turn clockwise, as viewed from above, and moves downwardly through the turn formed in its initial thread 24, and, as shown in Figure 6, no loop will be formed in its second thread 26; therefore, a knot will not be formed between its threads 26 and 24 as will be done on the adjacent threads.

As described hereinabove, the rotative movements of the sleeve 28 are not the same as the rotative movements of the adjacent soldier pins 18; therefore the sleeve 28 must be controlled by a mechanism distinct from the mechanism controlling rack 32. In the embodiment shown in Figures 7, 8, and 9, an auxiliary rack 34 is mounted along one edge of the soldier bar 20. This rack is in meshing engagement with sleeve gear 33 as shown in Figure 9, and any movement of the rack will be imparted to the sleeve. The upper surface of the rack 36 is provided with a pair of slots 38 and pins 40 mounted therethrough and secured in the rack bar so that the rack 34 is mounted for longitudinal movement along the soldier bar 20. As shown in Figure 9, the rack is allowed to move back and forth along the soldier bar without touching any of the regular soldier pins. The forward edge of the rack is provided with a ledge plate 42 which overlaps the edge of the gear on the sleeve, thus the sleeve is held in a fully seated position over its particular soldier pin. As shown in Figure 8, the soldier pin over which the sleeve 28 is mounted will perform the usual movements of the other soldier pins; however, this will have no effect upon the sleeve, nor will it enter into the netting operation.

The auxiliary rack 34, as shown in Figure 7, is biased to the right by a spring 44 to an extreme rightward position. In this position the sleeve will assume the position shown in Figure 2 which is the initial starting position. During the subsequent operations in net making, the rack will move in steps to the left so that the sleeve 28 will move in steps of a quarter of a turn each from one position to another, as shown in Figures 2 through 6, until the rack 34 reaches an extreme leftward position at which time it is released and returned by the spring 44. The rack 34 is connected by an adjustable bolt 46 to a collar 48 which is slidably mounted on a rod 50, this rod being mounted on a pair of side frame members 52 and 54. This rod carries the soldier pin actuating rack 32 which extends out of the left end at 56 where the rack is under control of a mechanism generally designated at 58 which is coordinated to the timed operation of the over-all machine. The side frame members 52 and 54 are movably mounted so as to carry the soldier pins to and from the working station, and the soldier pins can be moved in an oscillatory manner about the rod 50 when the rod is rotated by a gear 60 mounted thereon which meshes with a rack 62. The collar 48 and the auxiliary rack 34 are moved back and forth along the soldier bar by a linkage mechanism which consists of a link 64 pivoted at 68 to an extensible lever arm 66, the lever arm being pivoted at 70 to a plate 72 mounted on a side frame member 52. The extensible lever arm 66 is connected to a pivoted lever 74 by a link 76. Therefore, as the lever 74 is oscillated, the auxiliary rack 34 will be moved back and forth along the soldier bar.

The lever 74 can be controlled by any one of a number of actuating mechanisms, and I have found it most expeditious to use a conventional face cam which operates in timed relationship with the knitting operations of the machine. This face cam is a conventional cam with four active surfaces in stepped relationship which engage a follower on the lever 74 so that the auxiliary rack 34 will be moved in four equal increments to rotate the sleeve 28 a quarter of a turn for each active face of the cam, and at the end of a knitting cycle the face cam drops off to a low point allowing the rack 34 to return under the bias of spring 44 to its extreme right-hand position. I have not shown or described this particular cam as I consider its design conventional.

Figure 12:
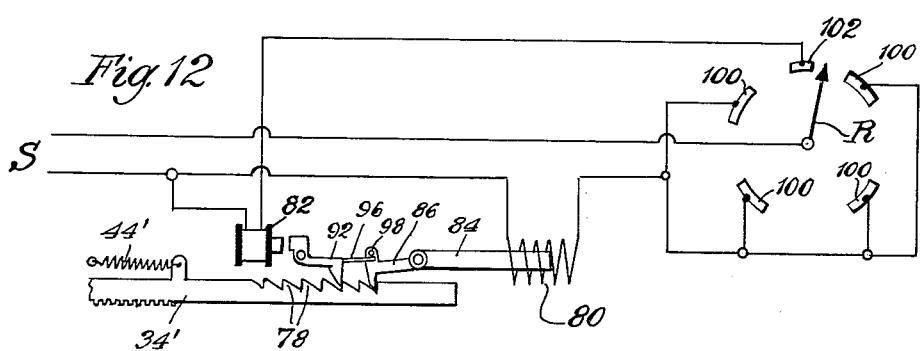
Figure 12 is a schematic view showing the electric control for the solenoid mechanism shown in Figures 10 and 11.

I have devised several other means of imparting the intermittent steps to the sleeve 28. In Figures 10, 11, and 12, I illustrate a solenoid controlled mechanism for actuating the auxiliary rack bar. In Figure 11, the auxiliary rack 34' is provided with a series of teeth or notches 78 on its upper edge, these notches being equally spaced and designed so as to only be active in one direction. An actuating solenoid 80 is positioned on the top surface of the soldier bar and opposes a releasing solenoid 82. The actuating solenoid 80 has an armature 84 which carries on its outer end a pawl 86 pivoted thereto. This pivotal connection between the pawl 86 and armature 84 is provided with a coil spring 94 which is adapted to bias the holding pawl into engagement with the notched upper surface of the auxiliary rack 34. The holding pawl 92 is provided with an extension 96 which extends under a pin 98 carried by the actuating pawl 86.

Upon energization of the actuating solenoid 80, the armature 84 will be carried to the right in Figure 11, and pawl 86 will move the auxiliary rack 34 a distance of one notch. When the actuating solenoid is de-energized and the armature 84 is moved to the left by the coil spring 90, the rack will remain in its rightward position as it is held there by the holding pawl 92. Thus intermittent energization of the actuating solenoid will result in a step by step movement of the rack 34' to the right in Figure 11 extending the rack return spring 44'. Upon energization of the releasing solenoid 82, the holding pawl 92 will be raised out of engagement with one of the notches 78 and due to its extension 96 fitting under the pin 98, the actuating pawl 86 will also be raised to completely free the rack 34 so that it will be returned to its extreme leftward position by the spring 44'.

As shown in Figure 12, the actuating and releasing solenoids 80 and 82 are controlled by a rotor R which rotates at a uniform speed in synchronism with the power unit of the netting machine. The rotor R is provided with four plates 100 which are equally spaced about the same so as to be sequentially contacted during its rotation, and these plates are connected by appropriate leads to the actuating solenoid 80. With the rotor connected to one side of a power source S and each of the plates 100 connected to the other side, the circuit is closed each time the rotor contacts one of the plates. As the energizing solenoid 82 resides between each of the plates and the main power source, it is energized each time the rotor contacts one of the plates. An extra plate 102 is positioned in the rotor cycle at any convenient point, and this plate, by a suitable lead, is connected to the releasing solenoid 82 so that at some point in the rotor cycle the releasing solenoid 82 will be energized to thus release the auxiliary rack bar 34 and allow the same to be returned to its initial position under the bias of its return spring 44'.

Another form of my invention is shown in Figures 13 through 17 and includes a hydraulic unit for actuating the sleeve 28 through its quadrant steps. In this embodiment, as shown in Figure 14, a hydraulic cylinder is mounted on the top surface of the soldier bar, this cylinder being shown at 104. Each side of the cylinder is connected by a suitable hydraulic lead 105 and 106 to a hydraulic impulsing mechanism, shown in Figure 17, to be explained hereinbelow. A piston 108 in the cylinder is connected to a pawl 110 through a connecting rod 112, the pawl being pivoted to the connecting rod at 114 and spring biased downwardly into engagement with a ratchet 118 by a coil spring 116. Thus hydraulic impulses are transmitted to the cylinder 104, and as the piston 108 is moved to the right, as shown in this figure, the pawl 110 will also rotate the ratchet clockwise one space. The ratchet 118 is mounted on a shaft 120 which carries a large gear 122, this gear meshing with the sleeve gear 33 on the auxiliary sleeve 28. As impulses are transmitted to the hydraulic cylinder 104, the ratchet 118 and the gear 122 are rotated by the pawl 110 so that intermittent rotation is imparted to the sleeve 28, and by proper selection of the number of teeth on the gear 122 with relation to the number of teeth on the sleeve gear 32, the sleeve can be made to rotate one quarter of a turn for each impulse delivered to the hydraulic cylinder. A holding pawl 124 is spring biased into engagement with the ratchet 118 by a coil spring 126 so that the sleeve 28 will not be allowed any unauthorized movement.

Hydraulic impulses are imparted to the cylinder 104 by a mechanism schematically shown in Figure 17 which is composed of a storage tank for the hydraulic fluid, a pump for raising the pressure of the fluid delivered to a high pressure tank, and a differential valve 128. In the position shown in Figure 17, the valve 128 is positioned to deliver high pressure hydraulic fluid to the right side of the piston in the hydraulic cylinder by lead 105, thus moving the piston rod 112 to the left. When the valve 128 is rotated 90° to the position shown in dotted lines in Figure 17, high pressure hydraulic fluid will be delivered to the left side of the hydraulic cylinder through the upper hydraulic lead 106. Note that the valve 128 is adapted to deliver hydraulic fluid to the storage tank from the side of the cylinder that is not being subjected to the high pressure fluid. A link 130 connected to the arm of the differential valve 128 may be connected to any appropriate reciprocating part of the main netting machine which will operate the valve 128 in timed relationship to the other operations of the machine.

Another form of the invention is shown in Figures 18 through 21 in which it is not necessary to use an auxiliary sleeve placed over one of the soldier pins. In this embodiment a specially machined pin must be used in place of one of the regular pins. As shown in Figure 18, a collection of regular soldier pins 18 are spaced along the soldier bar; however, a special pin 32, unlike the other soldier pins, is interposed at any particular point selected by the operator. This special pin has a gear 134 on its shank which is spaced farther down the pin than the gear of the other soldier pins so that the gear does not line up with the other gears as shown in dotted lines in Figure 18. Thus the gear 134 is not engaged by the conventional rack 32, but has a rack of its own 136 which reciprocates within the soldier bar alongside the conventional rack 32 but is controlled by a mechanism separate from the mechanism that controls the conventional rack 32. The movements imparted to this special pin 132 will be the same as the intermittent quadrant movements imparted to the auxiliary sleeve 28, and the result accomplished with reference to the completed net, as explained hereinabove, will be the same. Figure 21 is a detailed view of this special pin 132 and it should be noted that the gear 134 thereon is positioned farther down the shank of the pin than the gear formed on the shanks of the conventional pins as best shown in Figure 18.

It should be noted that the mechanism shown in Figure 18 through 21, wherein a special machined pin is used in place of a soldier bar sleeve, is susceptible of use with any of the actuating mechanisms described hereinabove, such as the electrical system shown in Figures 10 through 12, the hydraulic system shown in Figures 13 through 17, or the mechanical system shown in Figures 7 through 9 with appropriate alterations being made on each one.

Figure 23:
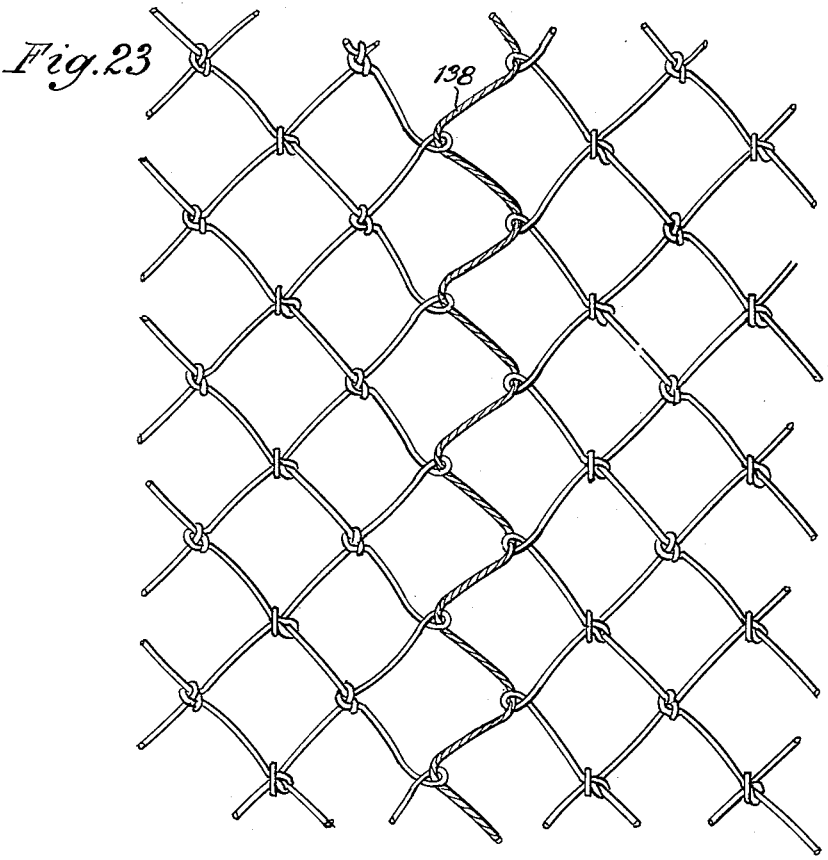
Figure 23 is another form of net wherein the slip thread is interposed between two sections of net in a modified fashion from that shown in Figure 1.

In Figure 23 I have shown a modified form of the completed net wherein a slip thread 138 has been supplied which is not looped through the loops formed in the strands of the adjoining net sections. This can be accomplished by giving the auxiliary sleeve 28 or the special pin 132 one quarter turn less than that described in the operation hereinabove, and the particular form of slip thread used is purely optional depending upon the type found most suitable and desirable.

The use and operation of my invention and the various modifications thereof are as follows:

The sections of net produced by conventional netting machines are fairly long and narrow; consequently, to form a complete net for use in the fishing industry it is necessary to splice a plurality of these sections together. The splicing operation requires that the edges of two sections have sufficient slack or excess twine in the small loops to accommodate the knots formed during splicing. Conventional netting machines are not designed to provide for this excess or slack twine along the edges of the net sections and splices formed without this slack will produce a bunched and uneven connection between two sections. Accordingly, the object of my invention is to provide or design a netting machine which will interpose a slip mesh or removable strand of twine in any selected position in a net section. When the slip strand is removed, the section will be separated into two portions, and the newly formed edges will have a sufficient slack so that a satisfactory splicing operation can be performed between one of these portions and another formed in the same manner. It will be understood that the slip mesh or thread is located adjacent the edge of each of the sections so that when the thread is removed, only a small portion of the section will not be utilized.

I disclose primarily two means for incorporating a slip strand into a conventional net section. First, the auxiliary sleeve, shown in Figs. 2 through 6 and 22, and second, the special soldier pin shown in Figs. 20 and 21. Hereinabove I have only described the movements of the sleeve, as shown in Figs. 2 through 6, during which a knot is not formed by the strand which is handled or manipulated by the sleeve; however, it will be understood that the same movements are imparted to the special pin shown in Figs. 20 and 21, if it is used in place of the sleeve.

I have shown three actuating mechanisms for controlling the movements to the sleeve or special pin, it being understood that all three of these actuating mechanisms can be used with either the sleeve or the special pin. The first actuating mechanism is shown in Fig. 7 and consists primarily of an auxiliary rack 34 which engages the gear 33 on the sleeve 28. The movements of the auxiliary rack are controlled by the linkage mechanism in the left of Fig. 7 which leads to an appropriately faced cam. The movements imparted to the linkage mechanism by the cam will move the rack to the left in Fig. 7 with four equal steps or movements to rotate the sleeve 28 one-quarter of a turn clockwise (in Fig. 9) per step until a complete revolution of the sleeve has been completed, whereupon the cam will allow the rack to be returned rightward to the starting position by the spring 44. This same type of mechanism can be used to control the movements of the special pin in Figs. 20 and 21, the rack 136 being substituted for the rack 34.

The second actuating mechanism is shown primarily in Figs. 10 and 11 and includes a rack 34′ which engages the gear 33 on the sleeve. The rack is moved to the right in Fig. 11 in four steps by the actuating solenoid 80, the pawl 86 engaging the teeth or notches 78. The holding pawl 92 rests in one of the notches and prevents the rack from returning to the left in Fig. 11 under the bias of spring 44′. The solenoid 80 is sequentially energized by the rotor R, schematically shown in Fig. 12, the rotor being connected in any conventional manner to the main drive of the netting machine. As the rotor rotates it sequentially engages the plates 100 so that the solenoid 80 is energized to step the rack 34′ to the right. Once every four steps of the rack, the rotor contacts the extra plate 102 to energize solenoid 82. This withdraws the holding pawl 92 and actuating pawl 86 from the notches, allowing the rack 34′ to move to its extreme leftward position in Fig. 11 under the bias of spring 44′. In Fig. 11 I have shown two sleeves 28 and it should be understood that any desired number can be used with the rack 34′. This electrical actuating mechanism can also be used with the special pin of Figs. 20 and 21, although I have only shown the sleeve 28 therewith and this substitution would only require that the rack 34′ be replaced by the rack 136 in Fig. 18, with appropriate modifications in the mechanical design to accommodate such a substitution; however, the inventive concept is the same.

The third actuating mechanism is a hydraulic system which includes the hydraulically actuated piston 108, this piston having a pawl 110 which engages and rotates the ratchet 118. Rotation of the ratchet controls rotation of the gear 122 which imparts motion to the sleeve 28. Hydraulic impulses are delivered to the piston by the hydraulic mechanism shown in Fig. 17 which includes the oscillating valve 128. When the valve is in its extreme clockwise position the high pressure tank is in communication with the left side of the piston through the hydraulic lead 106. The right side of the piston is in communication with the storage tank and this results in the delivery of a high pressure impulse to the left side of the piston and movement of the piston rightward. The gearing in Fig. 14 is designed to rotate the sleeve 28 one-quarter of a revolution for each hydraulic impulse. When the valve 128 is in its extreme counterclockwise position the high pressure tank is in communication with the right side of the piston, and the left side of the piston is connected to the storage tank, thus the hydraulic impulse moves the piston and pawl leftward. This movement does not rotate the sleeve, as the pawl is being merely reset for the next movement.

This hydraulic system differs from the mechanical and electrical systems previously discussed in that it is not necessary to reset the sleeve 28 after four increments or steps of movement. The hydraulic system is adapted to rotate the sleeve in only one direction and it is never necessary to rerotate or reset the sleeve at the end of four steps of movement. Accordingly, the return spring 44 in the Fig. 7 modification and 44′ in the Fig. 11 modification are not necessary.

This hydraulic system can be used with the special pin in Figs. 20 and 21 by designing the gear 134 thereon to properly mesh with and be rotated by the large gear 122, the rack 136 in Fig. 18 being eliminated.

It will also be understood that more than one special pin 132 can be used with anyone of the three actuating mechanisms in a manner similar to the showing of the two sleeves 28 in Figs. 10 and 11.

While I have shown and described a preferred form and several alternate forms of my invention, it should be understood that the disclosure is only illustrative and should not be understood to limit or confine my invention except by the appended claims.

I claim:

1. In a device for making nets from a series of strands of thread suspended at a working station comprising a soldier bar movably mounted so as to reciprocate to and from the working station, a plurality of soldier pins rotatably mounted along the soldier bar and adapted to grasp the strands of thread at the working station when presented thereto by movement of the soldier bar, common drive means for actuating the soldier pins as a group so as to rotate the same in a predetermined pattern of movement in relation to the movement of the soldier bar so as to knot the various strands of thread together to form a symmetric pattern of net from the strands, and means for moving any selected strand along a different pattern of movement from the ones followed by the other strands so that the selected strand will fail to knot with the other strands but will only be looped therethrough, said last mentioned means comprising an auxiliary sleeve positioned over a selected one of the soldier pins and rotatable relative thereto for grasping said selected strand and means to rotate said sleeve independently of the soldier pins.

2. In a device for making nets from a series of strands of thread suspended at a working station comprising a soldier bar movably mounted so as to reciprocate to and from the working station, a plurality of soldier pins rotatably mounted along the soldier bar and adapted to grasp the strands of thread at the working station when presented thereto by movement of the soldier bar, common drive means for actuating the soldier pins as a group so as to rotate the same in a predetermined pattern of movement in relation to the movement of the soldier bar so as to knot the various strands of thread together to form a symmetric pattern of net from the strands, and means for moving any selected strand along a different pattern of movement from that followed by the other strands so that the selected strand will fail to knot with the other strands but will only be looped therethrough, said last-mentioned means including an auxiliary sleeve having a pinion and positioned over a selected one of the soldier pins and rotatable relatively thereto and a rack bar longitudinally disposed along the soldier bar meshing with said pinion and reciprocable therealong, for rotating said sleeve.

3. In a device for making nets from a series of strands of thread suspended at a working station comprising a soldier bar movably mounted so as to reciprocate to and from the working station, a plurality of soldier pins rotatably mounted along the soldier bar and adapted to grasp the strands of thread at the working station when presented thereto by movement of the soldier bar, common drive means for actuating the soldier pins as a group so as to rotate the same in a predetermined pattern of movement in relation to the movement of the soldier bar so as to knot the various strands of thread together to form a symmetric pattern of net from the strands, and means for moving any selected strand along a different pattern of movement from that followed by the other strands so that the selected strand will fail to knot with the other strands but will only be looped therethrough, said last-mentioned means including an auxiliary sleeve positioned over a selected one of the soldier pins and freely rotatable with respect thereto, and actuating means separate from the common drive means to actuate the sleeve so that the same will follow a pattern different from that followed by the soldier pins.

4. In a device for making nets from a series of strands of thread suspended at a working station comprising a soldier bar movably mounted so as to reciprocate to and from the working station, a plurality of soldier pins rotatably mounted along the soldier bar and adapted to grasp the strands of thread at the working station when presented thereto by movement of the soldier bar, common drive means for actuating the soldier pins as a group so as to rotate the same in a predetermined pattern of movement in relation to the movement of the soldier bar so as to knot the various strands of thread together to form a symmetric pattern of net from the strands, and means for moving any selected strand along a different pattern of movement from that followed by the other strands so that the selected strand will fail to knot with the other strands but will only be looped therethrough, said last-mentioned means including an auxiliary sleeve positioned over a selected one of the soldier pins and freely rotatable with respect thereto, and actuating means separate from the common drive means to actuate the sleeve so that the same will follow a pattern different from that followed by the soldier pins, the actuating means for the sleeve including electro-mechanical means for imparting intermittent rotary motion to the sleeve.

5. In a device for making nets from a series of strands of thread suspended at a working station comprising a soldier bar movably mounted so as to reciprocate to and from the working station, a plurality of soldier pins rotatably mounted along the soldier bar and adapted to grasp the strands of thread at the working station when presented thereto by movement of the soldier bar, common drive means for actuating the soldier pins as a group so as to rotate the same in a predetermined pattern of movement in relation to the movement of the soldier bar so as to knot the various strands of thread together to form a symmetric pattern of net from the strands, and means for moving any selected strand along a different pattern of movement from that followed by the other strands so that the selected strand will fail to knot with the other strands but will only be looped therethrough, said last-mentioned means including an auxiliary sleeve positioned over a selected one of the soldier pins and freely rotatable with respect thereto, and actuating means separate from the common drive means to actuate the sleeve so that the same will follow a pattern different from that followed by the soldier pins, the actuating means for the sleeve including a hydraulic system for imparting intermittent rotary motion to the sleeve.

6. In a device for making nets from a series of strands of thread suspended at a working station comprising a soldier bar movably mounted so as to reciprocate to and from the working station, a plurality of soldier pins rotatably mounted along the soldier bar and adapted to grasp the strands of thread at the working station when presented thereto by movement of the soldier bar, common drive means for actuating the soldier pins as a group so as to rotate the pins in a predetermined pattern of movement in relation to the movement of the soldier bar so as to knot the various strands of thread together to form a symmetric pattern of net in the strands, said common drive including a pinion on each of the soldier pins, a rack longitudinally disposed along the soldier bar and movably mounted with respect thereto and in meshing engagement with each of the pinions on the soldier pins, and means for varying the movement of any selected strand along a different pattern of movement from that imparted to the other strands so that the selected strand will fail to knot with the other strands but will only be looped therethrough, including a sleeve rotatably mounted over a selected soldier pin and freely rotatable with respect thereto, said sleeve having a pinion formed thereon, and power means for rotating the sleeve in a pattern different from the pattern followed by the soldier pins.

7. In a device for making nets from a series of strands of thread suspended at a working station comprising a soldier bar movably mounted so as to reciprocate to and from the working station, a plurality of soldier pins rotatably mounted along the soldier bar and adapted to grasp the strands of thread at the working station when presented thereto by movement of the soldier bar, common drive means for actuating the soldier pins as a group so as to rotate the pins in a predetermined pattern of movement in relation to the movement of the soldier bar so as to knot the various strands of thread together to form a symmetric pattern of net in the strands, said common drive including a pinion on each of the soldier pins, a rack longitudinally disposed along the soldier bar and movably mounted with respect thereto and in meshing engagement with each of the pinions on the soldier pins, and means for varying the movement of any selected strand along a different pattern of movement from that imparted to the other strand so that the selected strand will fail to knot with the other strands but will only be looped therethrough, including a sleeve rotatably mounted over a selected soldier pin and freely rotatable with respect thereto, said sleeve having a pinion formed thereon, and power means for rotating the sleeve in a pattern different from the pattern followed by the soldier pins, said last-mentioned means including a second rack longitudinally disposed along the soldier bar and reciprocable with respect thereto, said rack being in meshing engagement with the pinion formed on the sleeve, and mechanical means for sliding the rack in intermittent steps along the soldier bar in predetermined timed relationship to the operations of the netting machine.

8. In a device for making nets from a series of strands of thread suspended at a working station comprising a soldier bar movably mounted so as to reciprocate to and from the working station, a plurality of soldier pins rotatably mounted along the soldier bar and adapted to grasp the strands of thread at the working station when presented thereto by movement of the soldier bar, common drive means for actuating the soldier pins as a group so as to rotate the pins in a predetermined pattern of movement in relation to the movement of the soldier bar so as to knot the various strands of thread together to form a symmetric pattern of net in the strands, said common drive including a pinion on each of the soldier pins, a rack longitudinally disposed along the soldier bar and movably mounted with respect thereto and in meshing engagement with each of the pinions on the soldier pins, and means for varying the movement of any selected strand along a different pattern of movement from that imparted to the other strands so that the selected strand will fail to knot with the other strands but will only be looped therethrough, including a sleeve rotatably mounted over a selected soldier pin and freely rotatable with respect thereto, said sleeve having a pinion formed thereon, and power means for rotating the sleeve in a pattern of movement different from the pattern followed by the soldier pin, said last-mentioned means including a second rack longitudinally disposed along the soldier bar and reciprocable with respect thereto, said rack being in meshing engagement with the pinion formed on the sleeve, and mechanical means for sliding the rack in intermittent steps along the soldier bar in predetermined timed relationship to the operations of the netting machine, said mechanical means including an electro-mechanical system actuatable in a predetermined timed relationship with the operation of the netting machine to move the auxiliary rack bar in a step by step manner along the soldier bar.

9. In a device for making nets from a series of strands of thread suspended at a working station comprising a soldier bar movably mounted so as to reciprocate to and from the working station, a plurality of soldier pins rotatably mounted along the soldier bar and adapted to grasp the strands of thread at the working station when presented thereto by movement of the soldier bar, common drive means for actuating the soldier pins as a group so as to rotate the same in a predetermined pattern of movement in relation to the movement of the soldier bar so as to knot the various strands of thread together to form a symmetric pattern of net from the strands, a pin sleeve mounted for rotation on a selected one of said soldier pins and a second drive means actuating said sleeve on said selected soldier pin along a different pattern of movement from that followed by the other soldier pins so that the strand of thread at the operating station corresponding to the selected soldier pin having a rotatable sleeve thereon will fail to knot with the other strand but will only be looped therethrough, said common drive means for actuating the soldier pins as a group including a pinion disposed along the shank of each of the soldier pins, and a rack mounted to reciprocate longitudinally along the soldier bar and in meshing engagement with each of the pinions on the soldier pins, the means for moving said pin sleeve along a different pattern of movement from that followed by the other soldier pins including a pinion disposed on the sleeve in a location removed from the common location occupied by the pinions on the other soldier pins, and an auxiliary rack movably mounted in a longitudinal direction along the soldier bar and in meshing engagement with the pinion on the pin sleeve so as to rotate the sleeve on the selected pin in a pattern different from the pattern followed by the other pins.

10. In a device for making nets from a series of strands of thread suspended at a working station comprising a soldier bar movably mounted so as to reciprocate to and from the working station, a plurality of soldier pins rotatably mounted along the soldier bar and adapted to grasp the strands of thread at the working station when presented thereto by movement of the soldier bar, common drive means for actuating the soldier pins as a group so as to rotate the same in a predetermined pattern of movement in relation to the movement of the soldier bar so as to knot the various strands of thread together to form a symmetrical pattern of net from the strands, a pin sleeve mounted for rotation on a selected one of said soldier pins and a second drive means actuating said sleeve on the selected one of the soldier pins along a different pattern of movement from that followed by the other soldier pins so that the strand of thread at the operating station corresponding to the selected soldier pin will fail to knot with the other strands and will only be looped therethrough, said second means including a hydraulic system for imparting motion to the sleeve on said selected soldier pin.

11. In a device for making nets from a series of strands of thread suspended at a working station comprising a soldier bar movably mounted so as to reciprocate to and from the working station, a plurality of soldier pins rotatably mounted along the soldier bar and adapted to grasp the strands of thread at the working station when presented thereto by movement of the soldier bar, common drive means for actuating the soldier pins as a group so as to rotate the same in a predetermined pattern of movement in relation to the movement of the soldier bar so as to knot the various strands of thread together to form a symmetrical pattern of net from the strands, a pin sleeve mounted for rotation on a selected one of said soldier pins and a second drive means actuating said sleeve on the selected one of the soldier pins along a different pattern of movement from that followed by the other soldier pins so that the strand of thread at the operating station corresponding to the selected soldier pin will fail to knot with the other strands and will only be looped therethrough, said second means including an electro-mechanical means for imparting motion to the sleeve on the selected soldier pin.

References Cited in the file of this patent

UNITED STATES PATENTS

| 1,110,718 | Saunders | Sept. 15, 1914 |
| 2,194,865 | Mizugoshi | Mar. 26, 1940 |
| 2,518,140 | Heggland | Aug. 8, 1950 |
| 2,641,951 | Sonnberger | June 16, 1953 |

FOREIGN PATENTS

| 653,582 | Great Britain | May 16, 1951 |
| 791,285 | France | Dec. 6, 1935 |
| 847,601 | France | Oct. 12, 1939 |